(12) United States Patent  (10) Patent No.: US 8,453,819 B2
Matranga et al.  (45) Date of Patent: Jun. 4, 2013

(54) BALANCED CLUTCH SYSTEM

(75) Inventors: Gerald A. Matranga, Union Grove, WI (US); Glenn E. Meeusen, Racine, WI (US)

(73) Assignee: Twin Disc, Inc., Racine, WI (US)

( * ) Notice: Subject to any disclaimer, the term of this patent is extended or adjusted under 35 U.S.C. 154(b) by 560 days.

(21) Appl. No.: 12/710,003

(22) Filed: Feb. 22, 2010

(65) Prior Publication Data
US 2011/0203896 A1 Aug. 25, 2011

(51) Int. Cl.
*F16D 25/0638* (2006.01)
*F16D 25/10* (2006.01)
*F16D 25/12* (2006.01)

(52) U.S. Cl.
USPC ............... 192/85.25; 192/48.614; 192/106 F

(58) Field of Classification Search
USPC ................. 192/85.25, 85.45, 85.46, 106 F
See application file for complete search history.

(56) References Cited

U.S. PATENT DOCUMENTS

| | | | |
|---|---|---|---|
| 2,529,423 A | 11/1950 | Schou | |
| 2,764,269 A | 9/1956 | Schjolin | |
| 2,853,167 A | 9/1958 | Kelley | |
| 2,939,558 A | 6/1960 | Schjolin | |
| 3,033,334 A | 5/1962 | Herbenar | |
| 3,180,457 A | 4/1965 | Bohnsack | |
| 3,215,237 A | 11/1965 | Davies | |
| 3,224,537 A | 12/1965 | Hilpert | |
| 3,362,481 A | 1/1968 | Steinhagen | |
| 3,368,656 A | 2/1968 | Hilpert | |
| 3,438,472 A | 4/1969 | Hillegass | |
| 3,470,988 A | 10/1969 | Sieverkropp | |
| 3,472,350 A | 10/1969 | Overson | |
| 3,508,450 A | 4/1970 | Richards | |
| 3,534,840 A | 10/1970 | Snoy | |
| 3,537,557 A | 11/1970 | Olson | |
| 3,542,177 A | 11/1970 | Hydromekanik | |
| 3,576,241 A | 4/1971 | Maurice | |
| 3,581,858 A | 6/1971 | Haley | |
| 3,602,347 A | 8/1971 | Yamaguchi | |
| 3,612,237 A | 10/1971 | Honda | |
| 3,647,037 A | 3/1972 | Toma | |
| 3,651,909 A | 3/1972 | Zautaszwili | |
| 3,677,381 A | 7/1972 | Takagi | |
| 3,719,259 A | 3/1973 | Burcz | |
| 3,734,258 A | 5/1973 | Roob | |
| 3,762,520 A | 10/1973 | Busch | |
| 3,822,770 A | 7/1974 | Golan | |
| 3,823,802 A | 7/1974 | Winzeler | |
| 3,833,100 A | 9/1974 | Aschauer | |
| 3,856,124 A | 12/1974 | Mack | |
| 3,863,746 A | 2/1975 | Schulz | |
| 3,944,036 A | 3/1976 | Koshelev | |
| 3,974,743 A | 8/1976 | Ivey | |
| 4,147,245 A | 4/1979 | Folomin | |

(Continued)

*Primary Examiner* — David D Le
*Assistant Examiner* — Jacob S Scott
(74) *Attorney, Agent, or Firm* — Boyle Fredrickson, S.C.

(57) ABSTRACT

A balanced clutch system is provided for use in a transmission. The balanced clutch system includes a clutch assembly that has a clutch piston and a balance piston that cooperate with a clutch piston cavity and a balance piston cavity. Each of the clutch piston cavity and balance piston cavity receives a continuous supply of fluid and establishes a centrifugal head pressure therein, during use. The centrifugal head pressure established in the balance piston cavity contributes to a force that opposes a self-engaging tendency of the clutch assembly that is created by the centrifugal head pressure established within the clutch piston cavity.

15 Claims, 4 Drawing Sheets

U.S. PATENT DOCUMENTS

| | | | |
|---|---|---|---|
| 4,238,020 | A | 12/1980 | Nerstad |
| 4,261,455 | A | 4/1981 | Uitenbroek |
| 4,271,951 | A | 6/1981 | Nishimura |
| 4,399,900 | A | 8/1983 | Ballendux |
| 4,421,218 | A | 12/1983 | Haight |
| 4,425,879 | A | 1/1984 | Shadday |
| 4,458,797 | A | 7/1984 | Hawkins |
| 4,494,942 | A | 1/1985 | Hirano |
| 4,502,582 | A | 3/1985 | Lech, Jr. |
| 4,509,627 | A | 4/1985 | Kawamoto |
| 4,520,912 | A | 6/1985 | Ferris |
| 4,574,926 | A | 3/1986 | Bubak |
| 4,574,931 | A | 3/1986 | Kowalczyk |
| 4,664,242 | A | 5/1987 | Downs |
| 4,706,789 | A | 11/1987 | McColl |
| 4,709,795 | A | 12/1987 | Ferris |
| 4,718,306 | A | 1/1988 | Shigematsu |
| 4,732,253 | A | 3/1988 | Hiramatsu |
| 4,741,422 | A | 5/1988 | Fuehrer |
| 4,759,432 | A | 7/1988 | Jurgens |
| 4,805,752 | A | 2/1989 | Malloy |
| 4,827,784 | A | 5/1989 | Muller |
| 4,834,229 | A | 5/1989 | Kanazawa |
| 4,840,261 | A | 6/1989 | Oshidari |
| 4,856,635 | A | 8/1989 | Vlamakis |
| 4,903,811 | A | 2/1990 | Kobayashi |
| 4,907,684 | A | 3/1990 | Breisch |
| 4,924,978 | A | 5/1990 | Ohkubo |
| 4,934,218 | A | 6/1990 | Takase |
| 4,938,330 | A | 7/1990 | Wallentowitz |
| 4,947,974 | A | 8/1990 | Smemo |
| 4,957,195 | A | 9/1990 | Kano |
| 4,964,506 | A | 10/1990 | Benford |
| 4,982,826 | A | 1/1991 | Holbrook |
| 5,004,085 | A | 4/1991 | Taureg |
| 5,083,648 | A | 1/1992 | Bulgrien |
| 5,133,696 | A | 7/1992 | Kobayashi |
| 5,137,624 | A | 8/1992 | Klotz |
| 5,148,903 | A | 9/1992 | Kobayashi |
| 5,172,799 | A | 12/1992 | Iijima |
| 5,226,517 | A | 7/1993 | Grochowski |
| 5,259,489 | A | 11/1993 | Kimura |
| 5,411,123 | A | 5/1995 | Rej |
| 5,421,439 | A | 6/1995 | Hayasaki |
| 5,439,088 | A | 8/1995 | Michioka |
| 5,542,517 | A | 8/1996 | Peruski |
| 5,551,548 | A | 9/1996 | Shubinsky |
| 5,568,853 | A | 10/1996 | Adriaenssens |
| 5,630,492 | A | 5/1997 | Yoshikawa |
| 5,647,467 | A | 7/1997 | Yamauchi |
| 5,651,288 | A | 7/1997 | Meeusen |
| 5,662,198 | A | 9/1997 | Kojima |
| 5,680,919 | A | 10/1997 | Sekiguchi |
| 5,865,289 | A | 2/1999 | Ishimaru |
| 5,887,690 | A | 3/1999 | Haupt |
| 5,950,787 | A | 9/1999 | Murasugi |
| 6,021,879 | A | 2/2000 | Pelouch |
| 6,035,989 | A | 3/2000 | Matsuoka |
| 6,347,695 | B1 | 2/2002 | Kuhn |
| 6,382,382 | B1 | 5/2002 | Avny |
| 6,454,074 | B1 | 9/2002 | Kundermann |
| 6,464,059 | B1 | 10/2002 | Kundermann |
| 6,488,138 | B1 | 12/2002 | Baur |
| 6,513,636 | B2 | 2/2003 | Han |
| 6,543,597 | B2 | 4/2003 | Tanikawa |
| 6,585,088 | B1 | 7/2003 | Fontaine |
| 6,595,339 | B1 | 7/2003 | Bauknecht |
| 6,595,340 | B2 | 7/2003 | Moorman |
| 6,675,944 | B2 | 1/2004 | Lee |
| 6,684,995 | B1 | 2/2004 | Page |
| 6,705,447 | B2 | 3/2004 | Gorman |
| 6,758,786 | B2 | 7/2004 | Lepelletier |
| 6,840,363 | B2 | 1/2005 | Braford, Jr. |
| 6,929,107 | B2 | 8/2005 | Hegerath |
| 6,935,481 | B2 | 8/2005 | Schmidt |
| 6,991,078 | B2 | 1/2006 | Leber |
| 7,021,447 | B2 | 4/2006 | Duwel |
| 7,036,646 | B2 | 5/2006 | Yabe |
| 7,040,474 | B2 | 5/2006 | Pedersen |
| 7,223,202 | B2 | 5/2007 | Tryon |
| 7,232,022 | B2 | 6/2007 | Aoki |
| 7,232,402 | B2 | 6/2007 | Tryon |
| 7,246,692 | B2 | 7/2007 | Braford |
| 7,284,647 | B2 | 10/2007 | Onishi |
| 7,287,635 | B2 | 10/2007 | Gratzer |
| 7,318,512 | B2 | 1/2008 | Bauer |
| 7,350,635 | B2 | 4/2008 | De Maziere |
| 7,416,069 | B2 | 8/2008 | Tiesler |
| 7,431,138 | B2 | 10/2008 | Heinrich |
| 7,445,108 | B2 | 11/2008 | Bauer |
| 7,478,718 | B2 | 1/2009 | De Maziere |
| 7,487,865 | B2 | 2/2009 | Stevenson |
| 7,650,214 | B2 * | 1/2010 | Gooden et al. ................... 701/67 |
| 7,931,135 | B2 * | 4/2011 | Dougan et al. ............. 192/85.25 |
| 7,954,615 | B2 * | 6/2011 | Tiesler et al. ............ 192/48.619 |
| 2003/0038013 | A1 | 2/2003 | Ichikawa |
| 2003/0057051 | A1 | 3/2003 | Alfredsson |
| 2003/0075413 | A1 | 4/2003 | Alfredsson |
| 2004/0251107 | A1 | 12/2004 | Sefcik |
| 2005/0056514 | A1 | 3/2005 | Reisch |
| 2005/0067251 | A1 | 3/2005 | Braford, Jr. |
| 2005/0167234 | A1 | 8/2005 | Aoki |
| 2005/0205380 | A1 | 9/2005 | Raszkowski |
| 2007/0256907 | A1 | 11/2007 | Gremplini |
| 2008/0264692 | A1 | 10/2008 | Underwood et al. |
| 2009/0105916 | A1 | 4/2009 | Gooden et al. |
| 2009/0229942 | A1 | 9/2009 | Tiesler et al. |

* cited by examiner

BALANCED CLUTCH SYSTEM

BACKGROUND OF THE INVENTION

1. Field of the Invention

The present invention relates generally to clutch systems for industrial transmissions an more specifically to an industrial transmission that has a balanced clutch system that resists self-engaging.

2. Discussion of the Related Art

It is known that industrial transmissions are suitable for numerous power transmitting applications. Recently, industrial transmissions have been implemented more frequently in the well drilling and other energy production industries. For example, in light of concerns regarding hydrocarbon availability, efforts have been made to increase productivity of hydrocarbon wells, in terms of efficiency and overall production. One known technique for increasing productivity of a hydrocarbon well is to stimulate the well by hydraulically (or using other fluids for) fracturing the subterranean geological formation of the well in a manner that increases permeability and therefore flow rate of the well, increasing its productivity.

Many efforts have been made to provide machines and systems that incorporate transmissions and are suitable for such well-stimulating fracturing tasks. Accordingly, machines and systems (referred to hereinafter as "fracturing machines") have been introduced for pumping fluids into hydrocarbon wells. Such machines typically have an internal combustion engine that drives a transmission which, in turn, drives a hydraulic pump to generate pressures that are large enough to fracture the underground formations, increasing well productivity. As power requirements for fracturing procedures have increased over time, so have the demands on the transmissions in the fracturing machines.

Use of these fracturing machines can require them to be operated for extended periods of time. During such extended periods of use, the transmission may be required to selectively engage or disengage various transmission or PTO (power take off) outputs, so as to direct power from the engine toward one or more well-drilling or pumping related tools or accessories.

Typical transmissions used in fracturing machines include hydraulically actuated clutches. The clutches are mounted on shaft assemblies that, at times, rotate when the clutch is disengaged. The clutch itself, or components thereof, may also rotate when disengaged. With the shaft and/or clutch rotating while the clutch is disengaged, oil volume captured in a clutch piston cavity establishes a centrifugal pressure head that is proportionate to shaft rotational speed. This centrifugal pressure acts on the clutch piston, actuating the clutch piston toward its engaged position and thereby self-engaging or auto-engaging due to the centrifugal oil pressure head. Self-engagement of clutches can be problematic whether they are fully engaged or partially engaged so as to create a rotational drag or slipping condition within the clutch that can create heat and reduce the use life of various clutch components.

Some efforts have been made to alleviate clutch self-engagement that is caused by centrifugal head pressure. Some attempts are only able to prevent clutch self-engagement at certain narrowly defined operational (rotating) speeds. Typical clutch self-engagement attenuating configurations evacuate pressure behind the clutch piston, for example, by draining oil from the clutch piston cavity that is behind the clutch piston. Draining the clutch piston cavity in this way can cause actuation delays when trying to move the clutch piston. For example, prior art clutches can experience a clutch disengagement delay because it takes time to evacuate oil from the clutch piston cavity. These prior art clutches can also experience a clutch engagement delay because the clutch piston cavity has to be sufficiently replenished before a hydraulic pressure can build therein, to an extent needed to hydraulically push the clutch piston.

The prior systems fail to provide a solution to the problem of preventing clutch self-engagements while maintaining quick actuation response characteristics of clutches.

Accordingly, there was a need for a clutch system that can mitigate tendencies of clutch self-engagement across a wide range of operating speeds, while having quick actuation, engagement and disengagement characteristics. A solution which minimizes complexity without compromising integrity was preferred.

SUMMARY OF THE INVENTION

The present invention provides a balanced clutch system for use in a transmission and that provides equal and opposite balancing forces to a clutch piston, preventing the clutch piston from self-engaging due to a centrifugal oil pressure head. The balanced clutch system includes a clutch assembly that has a clutch piston and a balance piston that cooperate with a clutch piston cavity and a balance piston cavity. Each of the clutch piston cavity and balance piston cavity receives a continuous supply of fluid, for example, oil that is shared with the transmission, and establishes a centrifugal head pressure therein during use. The centrifugal head pressure established in the balance piston cavity contributes to a force that opposes a self-engaging tendency of the clutch assembly that is created by the centrifugal head pressure established within the clutch piston cavity. In other words, centrifugal head pressure within the clutch piston cavity biases the clutch piston toward its engaged position; however, centrifugal head pressure within the balancing piston cavity balances such self-engaging biasing force so as to mitigate the centrifugally generated self-engaging tendencies of the clutch system.

In one embodiment of the invention, a balance piston cavity provided between a clutch piston and balanced piston remains full of oil. Oil is continuously supplied to this balance piston cavity by an orifice that conveys transmission lubricating oil, the same lubricating oil that supplies all transmission components such as gears and bearings with forced lubrication.

In another embodiment of the present invention, the balanced clutch system includes a shaft being rotatable and having a lubricating fluid passage and a clutch fluid supply passage. A clutch assembly is provided concentrically around the shaft and includes a clutch input accepting power into the clutch assembly and a clutch output conveying power out of the clutch assembly. A clutch piston is also provided and is movable for (i) engaging the clutch assembly so as to translate rotation of the clutch input to rotation of the clutch output, and (ii) disengaging the clutch assembly so as to isolate the clutch input from the clutch output. The clutch assembly may further include a clutch piston cavity provided within the clutch assembly and accepting fluid from the clutch fluid supply passage of the shaft, and a balance piston cavity provided within the clutch assembly and accepting fluid from the lubricating fluid passage of the shaft. During use of the balanced clutch system, fluid in the clutch piston cavity and balance piston cavity establishes respective centrifugal head pressures that contribute to forces applied to opposing sides of the clutch piston such that when the clutch assembly is disengaged, the clutch piston remains in a substantially constant position during variations in such centrifugal head pressures.

According to another aspect of the invention, the centrifugal head pressures in the clutch piston cavity and balance piston cavity vary at the same rate of change with respect to each other. An outermost portion of the clutch piston cavity and an outermost portion of the balance piston cavity may be substantially equally spaced from the shaft in a radial direction.

According to another aspect of the invention, a balance piston is spaced from the clutch piston, the balance and clutch pistons being on opposing sides of the balance piston cavity. A pin may be provided that abuts the clutch piston and extends through the balance piston. The pin moves in unison with the clutch piston and applies an engaging force to a clutch pack of the clutch assembly when the clutch piston is biased toward the clutch pack.

The balance piston may be provided between the balance piston cavity and a clutch pack of the clutch assembly and a seal may extend between the balance piston and the shaft. Furthermore, the balance piston may be fixed with respect to movement along a longitudinal axis of the shaft. The balance piston may also have a surface area that is larger than a surface area of the clutch piston. The balance piston surface area can be defined at an interface between the balance piston and the balance piston cavity, and the clutch piston surface area can be defined at an interface between the clutch piston and the clutch piston cavity.

In another embodiment, the clutch piston and balance piston have dissimilar cross-sectional profiles. A portion of the balance piston can be housed inside of the clutch piston.

According to yet another embodiment, a smaller surface area of a first side of the clutch piston interfaces the clutch piston cavity and a larger surface area of a second side of the clutch piston interfaces the balance piston cavity. An outermost portion of the clutch piston cavity is located radially closer to the shaft than is an outermost portion of the balance piston cavity.

In another embodiment of the invention, the volume of the balance piston cavity varies inversely with respect to the volume of the clutch piston cavity, such that the volume of the clutch piston cavity increases when the volume of the balance piston cavity decreases, and the volume of the clutch piston cavity decreases when the volume of the balance piston cavity increases. The volumes of the clutch piston cavity and balance piston cavity remain substantially constant when the clutch pack is disengaged and while the centrifugal head pressures of the clutch piston cavity and the balance piston cavity vary, negating self-engaging tendencies of the clutch system.

In yet another embodiment of the invention, a force provided by the centrifugal head pressure within the balance piston cavity substantially mitigates the force provided by the centrifugal head pressure of the clutch piston cavity.

Another embodiment of the invention is directed to a balanced clutch system having a first balanced clutch assembly provided on a first rotatable shaft and a second balanced clutch assembly provided on a second rotatable shaft. Each of the first and second balanced clutch systems has a clutch piston and balance piston and a corresponding clutch piston cavity and balance piston cavity. The clutch piston cavity and the balance piston cavity of the first balanced clutch assembly define at least one of substantially analogous volumes and substantially analogous radial distances from a longitudinal axis of the first rotatable shaft. However, the clutch piston cavity and the balance piston cavity of the second balanced clutch assembly have different volumes and are located at different radial distances, at least at their outermost portions, from a longitudinal axis of the second rotatable shaft.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
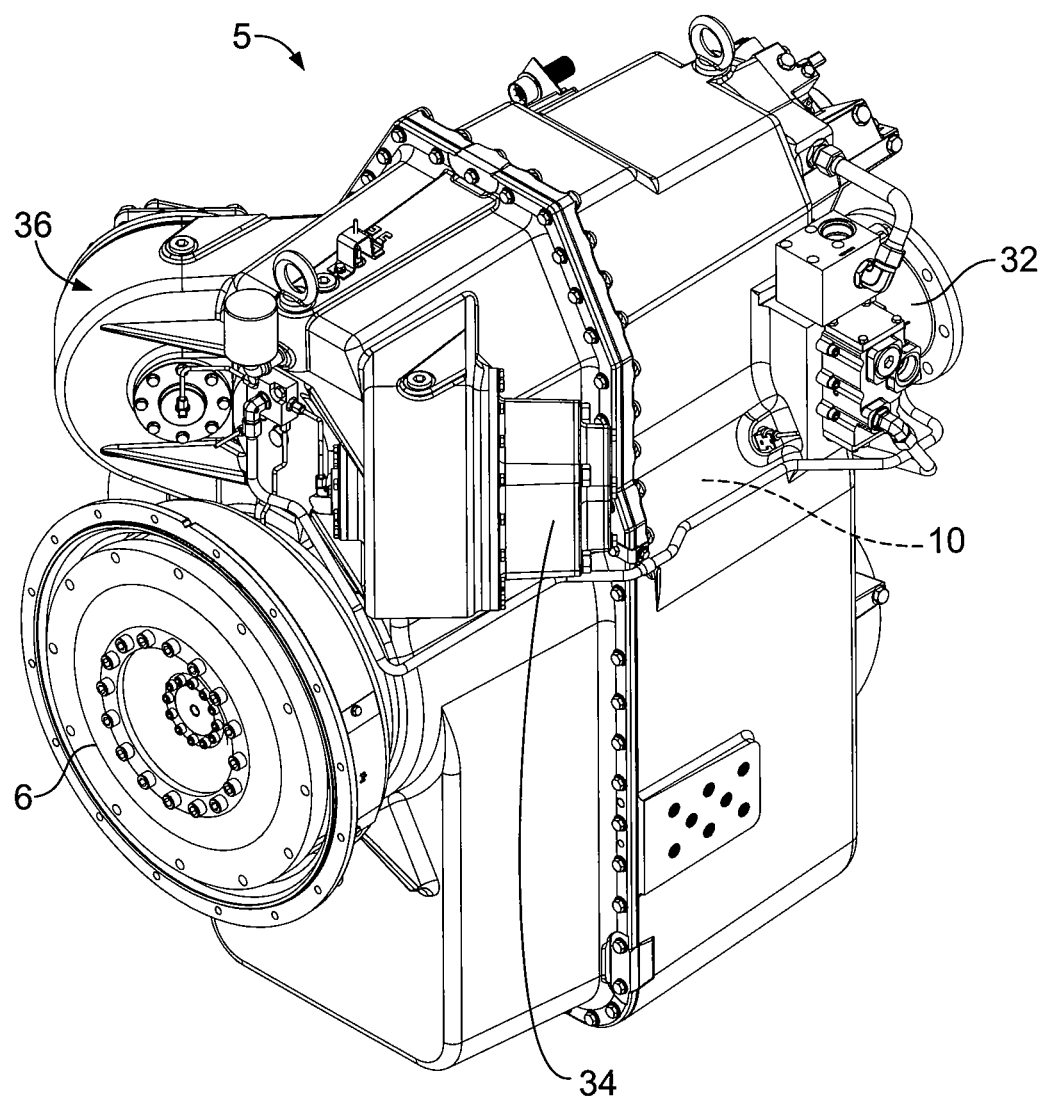
FIG. 1 is a pictorial view of a transmission incorporating a balanced clutch system in accordance with the present invention.
Figure 2:
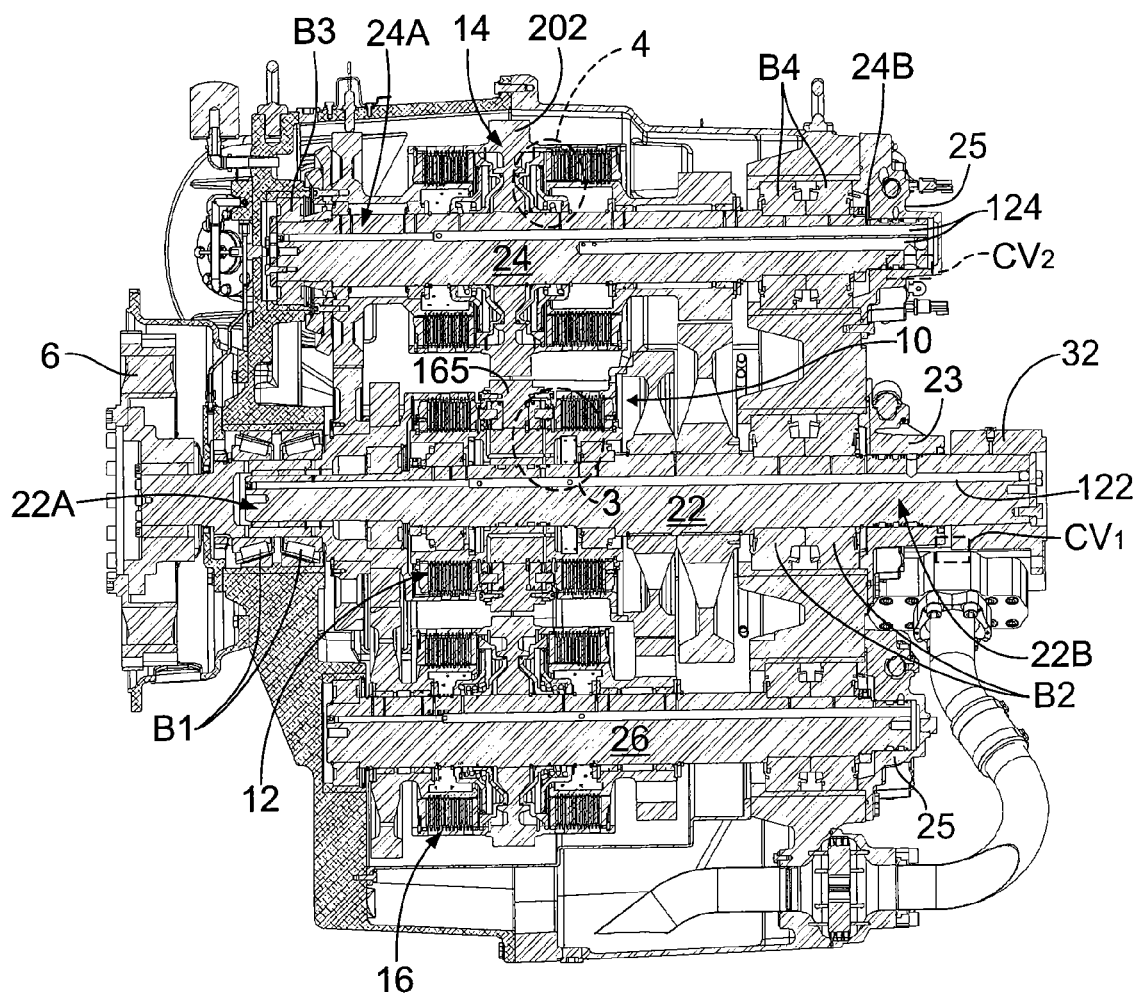
FIG. 2 is a cross-sectional side elevation of the transmission shown in FIG. 1.

With reference now to the drawings, and particularly to FIGS. 1 and 2, there is shown a pictorial and a cross-sectional view of a transmission 5 that incorporates a balanced clutch system 10 that is shown as having three clutch assemblies 12, 14, and 16 (FIG. 2), each being configured to provide equal and opposite balancing forces to a clutch piston, preventing the clutch piston from self-engaging due to a centrifugal oil pressure head. It is noted that for multiple clutch embodiments of the balanced clutch system 10 the various clutch assemblies 12, 14, 16 can have different configurations while achieving substantially the same self-engaging mitigation functions. As seen best in FIG. 2, clutch assemblies 14 and 16 are analogous to each other and their particular configuration is different from that of clutch assembly 12. The particular exemplary configurations are described in greater detail elsewhere herein.

Still referring to FIGS. 1 and 2, transmission 5 is preferably an industrial transmission such as, e.g., a model TA90-7500 transmission available from Twin Disc, Inc. Racine Wis., USA. Transmission 5 includes an input flange 6 that couples to and receives power from a prime mover, such as a crankshaft of an internal combustion engine. By way of the balanced clutch system 10, specifically by controlling the three clutch assemblies 12, 14, and 16, which are mounted upon shafts 22, 24, and 26 respectively, an operator may selectively direct power through the transmission 5 and/or to the various outputs of the transmission 5. The outputs include an output flange 32 and a pair of PTO's (power take offs) 34 and 36, each of which can transmit power from the prime mover to a driven device or accessory.

Figure 3:
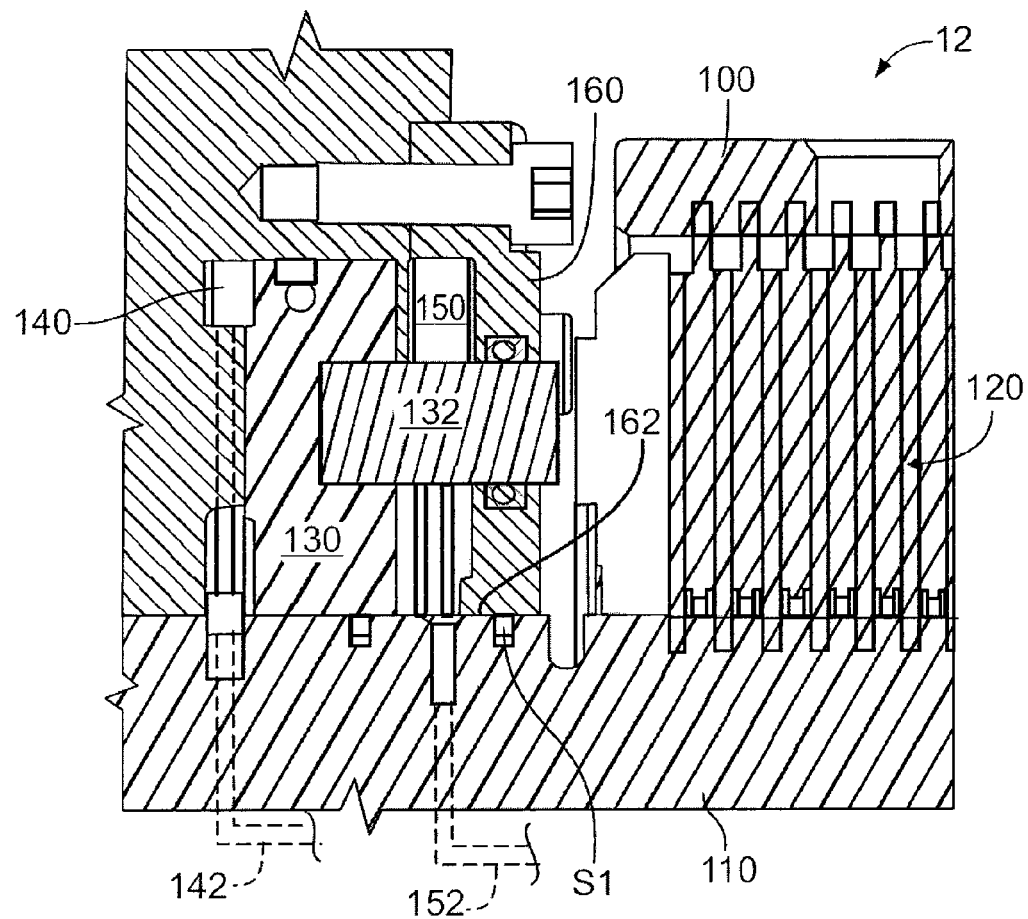
FIG. 3 is a close-up cross-sectional view of a portion of a first clutch assembly, taken at the dashed circle labeled "3" in FIG. 2.

Referring now to FIGS. 2 and 3, one end 22A of shaft 22 is supported by a pair of tapered roller bearings B1 and is splined to the input flange 6. A second end 22B of shaft 22 is supported by another pair of tapered roller bearings B2 and is connected to the output flange 32. A hydraulic collector 23 is provided concentrically around the second end of shaft 22, between the bearings and the output flange 32. Fluid passages 122 extend through the length of the shaft 22 and convey transmission lubricating oil, some of which is also used as the clutch actuating fluid. In this regard, the shaft 22 fluidly connects the collector 23 and the clutch assembly 12 to each other. A control valve $CV_1$ can be provided along this fluid connection, preferably at the second end 22B of the shaft 22 which is in the collector 23, for controlling fluid flow through the fluid passages 122 or other passages of the shaft 22.

As best seen in FIG. 3, clutch assembly 12 is configured to provide equal and opposite balancing forces to a clutch piston, preventing the clutch assembly 12 from self-engaging due to a centrifugal oil pressure head. Namely, clutch assembly 12 includes a clutch basket 100 and a clutch hub 110 that house a clutch pack 120 therebetween. Clutch pack 120 has multiple friction and smooth discs that are stacked against each other in an alternating series, with some being locked into rotational unison with the basket 100 and the others being locked into rotational unison with the hub 110. Axially compressing or squeezing the clutch pack 120 is what engages the clutch assembly 12 so that rotation of the basket 100 and hub 110 can be transmitted between each other. Such compressive or squeezing forces, that are used to engage the clutch pack 120 and thus clutch assembly 12, are provided by hydraulic actuation of clutch piston 130.

Still referring to FIG. 3, clutch piston 130 is has a seal engaging its outer and inner perimeters or circumferential surfaces, and is movable toward and away from the clutch pack 120 to engage and disengage it, respectively. A fluid filled clutch piston cavity 140 is adjacent a first side of the clutch piston 130 and a balance piston cavity 150 is adjacent a second side of the clutch piston 130. Each of the clutch piston cavity 140 and the balance piston cavity 150, by way of a respective orifice, receives a continuous supply of fluid, for example, oil that is shared with the transmission and is conveyed through the shaft 22. For example, the clutch piston cavity 140 receives fluid from a clutch fluid supply passage 142 which is connected to one or more of the fluid passages 122 extending through the shaft 22, which is configured for conveying fluid for actuating the clutch piston 130. The balance piston cavity 150 receives fluid from a lubricating fluid supply passage 152 which is connected to one or more of the fluid passages 122 extending through the shaft 22.

Still referring to FIG. 3, the volumes of each of the clutch piston cavity 140 and the balance piston cavity 150 are variable, although they vary inversely with respect to each other. In this regard, the volume of the clutch piston cavity 140 increases when the volume of the balance piston cavity 150 decreases, and the volume of the clutch piston cavity 140 decreases when the volume of the balance piston cavity 150 increases. However, the volumes of the clutch piston cavity 140 and balance piston cavity 150 only change when an operator purposefully actuates the clutch assembly 12. Correspondingly, the volumes of the clutch piston cavity 140 and balance piston cavity 150 remain substantially constant when the clutch pack 120 is disengaged, even if the centrifugal head pressures within the clutch piston cavity 140 and the balance piston cavity 150 vary, for example, when the rotational speed of shaft 22 changes.

Referring yet further to FIG. 3, an end boundary of the balance piston cavity 150 that is furthest from the clutch piston 130 is defined by a side surface of a balance piston 160. In this embodiment, balance piston 160 is adjacent but spaced from the clutch pack 120. The balance piston 160 is bolted, near its outer perimeter, to a gear 165 that is provided between a pair of clutch packs 120, with the clutch packs 120 being mirror images of each other as reflected about the gear 165 (FIG. 2). An inner perimeter, namely an inner circumferential surface 162, of the balance piston 160 is sealed against the clutch hub 110, by way of a seal $S_1$ that is seated in an undercut in the outer surface of the clutch hub 110.

Still referring to FIG. 3, an opening extends through the balance piston 160 and accepts a pin 132 therethrough. Pin 132 abuts and moves in unison with the clutch piston 130, extends through the balance piston 160, and engages the clutch pack 120 so as to translate movement of the clutch piston 130 to the clutch pack 120 without moving the balance piston 160. A compression spring (not shown) is provided between the clutch piston 130 and balance piston 160, typically being provided concentrically around the pin 132, to help urge the clutch piston 130 away from the clutch pack 120 during disengagement of the clutch pack 120, again without moving the balance piston 160.

Still referring yet further to FIG. 3, it is apparent that the dimensions and configurations of the clutch piston 130 and the balance piston 160 directly influence the dimensions and configurations of the clutch piston cavity 140 and the balance piston cavity 150. For example, below the interface between the balance piston 160 and the gear 165, a surface of balance piston 160 that faces shaft 22 is radially spaced from the shaft 22 by substantially the same distance as an outer circumferential surface of the clutch piston 130. Accordingly, in this embodiment, an outermost portion of the clutch piston cavity 140 and an outermost portion of the balance piston cavity 150 are substantially equally spaced from the shaft 22 in a radial direction.

Figure 4:
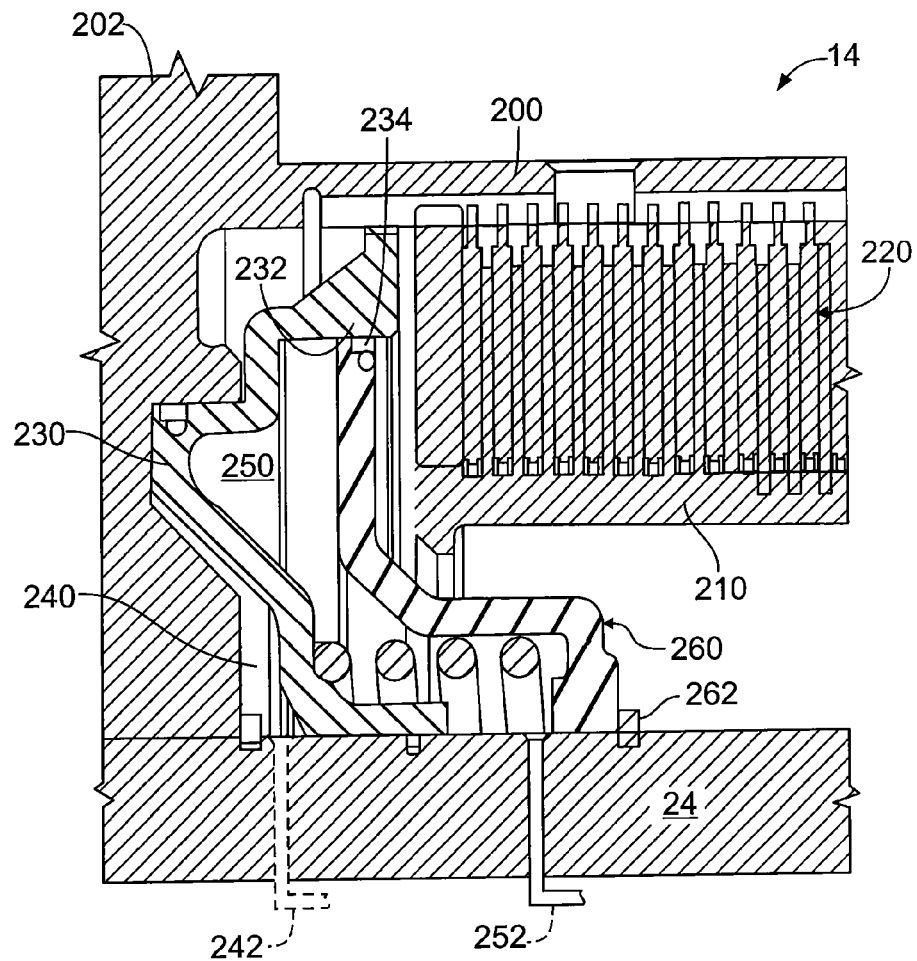
FIG. 4 is a close-up cross-sectional view of a portion of a second clutch assembly, taken at the dashed circle labeled "4" in FIG. 2.

Referring now to FIGS. 2 and 4, clutch assembly 14 is described, while noting that such description is equally applicable to the analogous clutch assembly 16 which is disposed substantially symmetrically to shaft 22. Description of shaft 26, upon which clutch assembly 16 is mounted, is likewise omitted. Clutch assembly 14 is concentrically mounted upon shaft 24. Shaft 24 is supported at a first end 24A by a roller bearing B3 and at a second end 24B by a pair of tapered roller bearings B4. A portion of the end 24B of shaft 24 that is supported by the pair of tapered roller bearings B4 extends past the bearings B4 and is housed in a hydraulic collector 25. As with shaft 22, shaft 24 includes fluid passages 124, extending longitudinally therethrough, which convey transmission lubricating oil, some of which is also used as the clutch actuating fluid, and a control valve $CV_2$ is preferably provided at an end of the shaft 22, for example end 24B, influencing the fluid flow through the shaft 22.

Referring now to FIG. 4, the clutch assembly 14 is also configured to provide equal and opposite balancing forces to a clutch piston, preventing the clutch assembly 14 from self-engaging due to a centrifugal oil pressure head. Clutch assembly 14 includes a clutch basket 200 and a clutch hub 210 that house a clutch pack 220 therebetween, the same as clutch pack 120. An input gear 202 is provided at an outer surface of the clutch basket 200, for driving the clutch assembly 14.

Still referring to FIG. 4, a clutch piston 230 is movable toward and away from the clutch pack 220 to engage and disengage it, respectively. A fluid filled clutch piston cavity 240 is adjacent a first side of the clutch piston 230 and a balance piston cavity 250 is adjacent a second side of the clutch piston 230. Each of the clutch piston cavity 240 and the balance piston cavity 250, by way of a respective orifice, receives a continuous supply of fluid, for example, oil that is shared with the transmission and is conveyed through the shaft 24. For example, the clutch piston cavity 240 receives fluid from a clutch fluid supply passage 242 which is connected to one or more of the fluid passages 124 extending through the shaft 24, which is configured for conveying fluid for actuating the clutch piston 230. The balance piston cavity 250 receives fluid from a lubricating fluid supply passage 252 which is connected to one or more of the fluid passages 124 extending through the shaft 24. As with the previously described embodiment of FIG. 3, the volumes of each of the clutch piston cavity 240 and the balance piston cavity 250 are variable and vary inversely with respect to each other.

Referring further to FIG. 4, balance piston 260 defines an end boundary of the balance piston cavity 250. The clutch piston 230 and balance piston 260 have dissimilar cross-sectional profiles and a portion of the balance piston 260 is housed inside of the clutch piston 230. Unlike the previously described embodiment, the inner diameter or inner circumferential surface of the balance piston 260 is not sealed against the shaft 24. However, the other perimeter of the balance piston 250 is sealed against an inwardly facing shoulder-like projection 232 of clutch piston 230, by way of seal 234. A compression spring (not labeled) is provided between the clutch piston 230 and the balance piston 260, concentrically around the shaft 24, to help urge the clutch piston 230 away from the clutch pack 220 during disengagement of the clutch pack 220. This can be done without moving the balance piston 260 by providing a retaining ring 262 on the shaft 24 that serves as a mechanical stop that prevents the balance piston 260 from sliding axially toward the clutch pack 220.

Still referring to FIG. 4, the clutch piston 230 and balance piston 260 are configured so that the clutch piston cavity 240 is smaller than and positioned radially closer to the shaft 24 than the balance piston cavity 250. Furthermore, since the clutch piston 230 separates the clutch piston cavity 240 and the balance piston cavity 250 from each other, the clutch piston 230 has a smaller surface area on its side that interfaces the clutch piston cavity 240 and a larger surface area on its opposing side that interfaces the balance piston cavity 250. In this embodiment, the balance piston cavity 250 is a void with an L-shaped perimeter having a triangular projection extending toward the input gear 202 from the upright segment of such L-shaped perimeter. Accordingly, the balance piston cavity 250 is asymmetrical about both longitudinal and transverse axes defined through axial and radial midpoints of the balance piston cavity 250.

In light of the above, the particular way in which the clutch assembly 12, 14, 16 balances the clutch piston 130, 230 depends on the particular configurations of and cooperation between the clutch piston cavity 140, 240 and balance piston cavity 150, 250. Referring to FIGS. 2 and 3, when shaft 22 and/or the clutch assembly 12 itself rotates, centrifugal head pressures of the clutch piston cavity 140 and balance piston cavity 150 will be largely analogous with respect to their common reference pressure $P_o$ that is defined within the collector 23. Stated another way, the centrifugal head pressures of clutch piston cavity 140 and balance piston cavity 150 will measure approximately the same in terms of their oil column value with respect to the oil column value of defined in the collector 23. Accordingly, balancing forces are applied from the clutch piston cavity 140 and balance piston cavity 150 toward the opposing sides of the balance piston 130, in opposite directions, holding the balance piston 130 in place despite variations in rotational speed of the system.

Referring now to FIGS. 2 and 4, when shaft 24 and/or the clutch assembly 14 itself rotates, the centrifugal head pressures of the clutch piston cavity 240 and balance piston cavity 250 are dissimilar with respect to their common reference pressure $P_o$ that is defined within the collector 25. Stated another way, the centrifugal head pressures of clutch piston cavity 240 and balance piston cavity 250 will measure differently or have different magnitudes in terms of their oil column value with respect to the oil column value defined in the collector 25. However, since the overall forces applied from the clutch piston cavity 240 and balance piston cavity 250 are functions of their respective radial distances from the shaft 24, and since the balance piston cavity 250 is further from the shaft 24, since the balance piston 260 surface area is larger than the clutch piston 230 surface area, the overall force applied to the clutch piston 230 from the clutch piston cavity 240 and balance piston cavity 250, in opposing directions, is substantially the same. Accordingly, in this embodiment also, when the clutch assembly 14 is disengaged, the balance piston 130 is held place despite variations in rotational speed of the system.

Regardless, it is noted that many changes and modifications may be made to the present invention without departing from the spirit thereof. The scope of some of these changes is discussed above. The scope of others will become apparent from the appended statements of invention.

What is claimed is:

1. A balanced clutch system, comprising:
   a shaft being rotatable and having a lubricating fluid passage and a clutch fluid supply passage;
   a clutch assembly provided concentrically around the shaft and including a clutch input accepting power into the clutch assembly, a clutch output conveying power out of the clutch assembly, and a clutch piston that is movable for (i) engaging the clutch assembly so as to translate rotation of the clutch input to rotation of the clutch output, (ii) disengaging the clutch assembly so as to isolate the clutch input from the clutch output, the clutch assembly further including:
   a clutch piston cavity provided within the clutch assembly and accepting fluid from the clutch fluid supply passage of the shaft;
   a balance piston cavity provided within the clutch assembly and accepting fluid from the lubricating fluid passage of the shaft;
   a balance piston spaced from the clutch piston, the balance and clutch pistons being on opposing sides of the balance piston cavity; and
   a pin that abuts the clutch piston and extends through the balance piston, the pin moving in unison with the clutch piston and applying an engaging force to a clutch pack of the clutch assembly when the clutch piston is biased toward the clutch pack,
   wherein during use of the balanced clutch system, fluid in the clutch piston cavity and balance piston cavity establish respective centrifugal head pressures that contribute to forces applied to opposing sides of the clutch piston such that when the clutch assembly is disengaged, the clutch piston remains in a substantially constant position during a variation in respective centrifugal head pressures.

2. The balanced clutch system of claim 1, wherein the respective centrifugal head pressures in the clutch piston cavity and balance piston cavity vary at the same rate of change with respect to each other.

3. The balanced clutch system of claim 1, wherein an outermost portion of the clutch piston cavity and an outermost portion of the balance piston cavity are substantially equally spaced from the shaft in a radial direction.

4. The balanced clutch system of claim 1, wherein the balance piston is provided between the balance piston cavity and a clutch pack of the clutch assembly.

5. The balanced clutch system of claim 4, further comprising a seal extending between the balance piston and the shaft.

6. The balanced clutch system of claim 4, wherein the balance piston is fixed with respect to movement along a longitudinal axis of the shaft.

7. The balanced clutch system of claim 1, wherein an outermost portion of the clutch piston cavity is located radially closer to the shaft than is an outermost portion of the balance piston cavity.

8. The balanced clutch system of claim 7, wherein the balance piston has a surface area that is larger than a surface area of the clutch piston.

9. The balanced clutch system of claim 8, wherein (i) the balance piston surface area is defined at an interface between the balance piston and the balance piston cavity, and (ii) the clutch piston surface area is defined at an interface between the clutch piston and the clutch piston cavity.

10. The balanced clutch system of claim 9, wherein the clutch piston and balance piston have dissimilar cross-sectional profiles.

11. The balanced clutch system of claim 10, wherein a portion of the balance piston is housed inside of the clutch piston.

12. The balanced clutch system of claim 11, wherein a smaller surface area of a first side of the clutch piston interfaces the clutch piston cavity and a larger surface area of a second side of the clutch piston interfaces the balance piston cavity.

13. A balanced clutch system, comprising:
a clutch assembly provided concentrically around a shaft and including,
　a clutch pack that is either engaged to translate rotation of a clutch input to rotation of a clutch output; or disengaged to isolate the clutch input from the clutch output;
　a clutch piston that is movable toward the clutch pack to engage the clutch pack and being movable away from the clutch pack to disengage the clutch pack;
　a clutch piston cavity adjacent a first side of the clutch piston and defining a variable volume thereof, the clutch piston cavity formed in part by the first side of the clutch piston and a portion of a gear extending concentrically away from the shaft;
a balance piston cavity adjacent a second side of the clutch piston and defining a variable volume thereof, the volume of the balance piston cavity varying inversely with respect to the volume of the clutch piston cavity, such that the volume of the clutch piston cavity increases when the volume of the balance piston cavity decreases, and the volume of the clutch piston cavity decreases when the volume of the balance piston cavity increases; and
wherein the volumes of the clutch piston cavity and balance piston cavity remain substantially constant when the clutch pack is disengaged and while the centrifugal head pressures of the clutch piston cavity and the balance piston cavity vary.

14. A balanced clutch system, comprising:
a shaft being rotatable and conveying a fluid therethrough;
a balanced clutch assembly provided concentrically around the shaft and accepting the fluid that is conveyed through the shaft, the balanced clutch assembly including:
　a clutch basket provided toward an outer portion of the balanced clutch assembly;
　a clutch hub provided toward an inner portion of the balanced clutch assembly;
　a clutch pack provided between and selectively coupling the clutch basket and the clutch hub, such that (i) when the clutch pack is disengaged, the clutch basket and clutch hub are isolated from each other, and (ii) when the clutch pack is engaged, the clutch pack translates rotation between the clutch basket and clutch hub; and
　a clutch piston being fluidly actuated with respect to the clutch pack so as to move the least one clutch disc between the disengaged position and the engaged position;
　a clutch piston cavity adjacent a first side of the clutch piston and holding a volume of fluid, the clutch piston cavity formed in part by the first side of the clutch piston and a portion of a gear extending concentrically away from the shaft, wherein during rotation of the shaft, the fluid within the clutch piston cavity establishes a centrifugal head pressure that biases the clutch piston against the clutch pack;
　a balance piston provided between the clutch piston and the clutch pack;
　a balance piston cavity defined between the clutch piston and balance piston and holding a volume of fluid therein, wherein during rotation of the shaft, the fluid within the balance piston cavity establishes a centrifugal head pressure that biases the clutch piston away from the clutch pack; and
wherein the force provided by the centrifugal head pressure of the balance piston cavity substantially balances the force provided by the centrifugal head pressure of the clutch piston cavity so as to minimize self engagements of the clutch assembly.

15. A balanced clutch system, comprising:
a first balanced clutch assembly provided on a first rotatable shaft and having a clutch piston provided between a clutch piston cavity and a balance piston cavity, the clutch piston cavity and the balance piston cavity of the first balanced clutch assembly being subjected to centrifugal forces during use, such that fluid held within the clutch piston cavity and the balance piston cavity establish respective centrifugal head pressure on opposing sides of the clutch piston of the first balanced clutch assembly; and
a second balanced clutch assembly provided on a second rotatable shaft and having a clutch piston provided between a clutch piston cavity and a balance piston cavity of the second balanced clutch assembly, the clutch piston cavity and the balance piston cavity being subjected to centrifugal forces during use, such that fluid held within the clutch piston cavity and the balance piston cavity establish respective centrifugal head pressure on opposing sides of the clutch piston of the second balanced clutch assembly; and
wherein (i) the clutch piston cavity and the balance piston cavity of the first balanced clutch assembly define at least one of substantially analogous volumes and substantially analogous radial distances from a longitudinal axis of the first rotatable shaft to a radially outer most portion of each of the clutch piston cavity and the balance piston cavity of the first balance clutch assembly; and (ii) the clutch piston cavity and the balance piston cavity of the second balanced clutch assembly define different volumes and having different radial distances from a longitudinal axis of the second rotatable shaft to a radially outermost portion of each of the clutch piston cavity and the balance piston cavity of the second balance clutch assembly.

* * * * *